Figure 1:
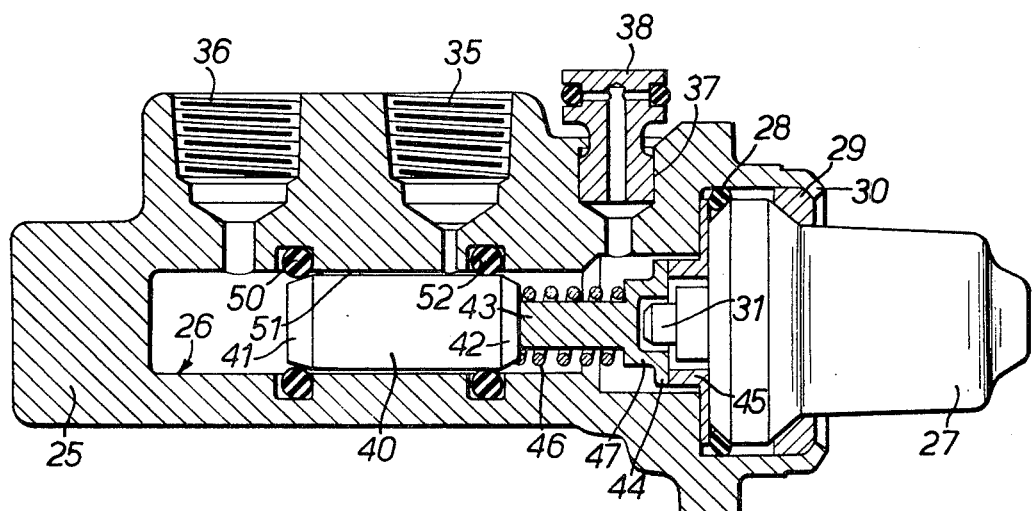

United States Patent [19]

Elmer

[11] 3,902,663
[45] Sept. 2, 1975

[54] THERMALLY ACTUATED CONTROL VALVES

[75] Inventor: Arthur Ernest Henry Elmer, Painswick, England

[73] Assignee: Dynair Limited, Nailsworth, England

[22] Filed: Jan. 11, 1974

[21] Appl. No.: 432,631

[30] Foreign Application Priority Data

Dec. 18, 1973  United Kingdom............... 58601/73

[52] U.S. Cl. .......... 236/87; 123/41.12; 137/625.65; 192/82 T; 251/324

[51] Int. Cl.² ....................................... G05D 23/02

[58] Field of Search................... 236/100, 101, 87; 123/41.12; 192/82 T, 85 A; 137/625.65; 251/324

[56] References Cited
UNITED STATES PATENTS

| | | |
|---|---|---|
| 2,485,504 | 10/1949 | Morgan................................ 251/324 |
| 2,524,142 | 10/1950 | Seeloff................................. 251/324 |
| 3,064,476 | 11/1962 | Naples............................... 236/87 X |
| 3,140,728 | 7/1964 | Webb................................. 251/324 X |
| 3,454,220 | 7/1969 | Bentz et al........................ 236/100 X |
| 3,738,571 | 6/1973 | Elmer.................................... 236/100 |

Primary Examiner—William E. Wayner
Assistant Examiner—William E. Tapolcai, Jr.
Attorney, Agent, or Firm—Young & Thompson

[57] ABSTRACT

A thermally actuated pneumatic control valve, in particular, for operating a pneumatic ram controlling a clutch in the drive to a rotary cooling fan of a vehicle motor. The valve has a casing forming a bore with two spaced resilient seals positioned respectively between an inlet and an outlet port and between the outlet and a relief port. The movable valve element is a plain cylindrical block actuated by but not positively connected to the plunger of a thermal capsule.

5 Claims, 2 Drawing Figures

THERMALLY ACTUATED CONTROL VALVES

This invention relates to control valves, and particularly though not exclusively to thermally actuated valves for controlling the supply of a pressure fluid such as compressed air to an actuator such as a pneumatic ram.

The invention is applicable especially to a control valve in a pneumatic control system for a pneumatically operated clutch in the drive to a cooling fan of an internal combustion engine. It is known to provide a thermally controlled clutch in the drive to a cooling fan, to disengage the drive when the temperature of the engine falls below a selected value. This is beneficial to the operating efficiency of the engine and maintains the working temperature at a selected value or within a selected range. The valve of the present invention in its preferred form is designed for use in such a thermally controlled cooling fan drive.

Broadly stated the invention consists in a thermally actuated pneumatic control valve, comprising a valve casing having an inlet port and a spaced outlet port, a longitudinally moveable valve element within the casing, and a thermal actuator arranged to cause movements of the valve element, the valve element being arranged to engage a pair of spaced resilient seals located in annular grooves formed in the internal surface of the casing, one seal between the inlet and outlet ports and the other on the side of the outlet port remote from the inlet port.

Preferably the valve includes a relief port at the side of the outlet port remote from the inlet port, and the second seal is located between the outlet and relief ports.

Also it is preferred that the effective length of the valve element is equal to or greater than the spacing between the two seals. This overlap ensures that there will be no direct communication between the inlet and relief ports.

In a particular preferred construction the thermal actuator is loosely coupled to or freely separable from the valve element, and the valve also includes a spring acting on the valve element urging the element towards the inlet port end of the casing.

The invention also consists in a control valve as defined, in combination with a cooling fan assembly for a vehicle engine, the thermal actuator being located in part of a liquid coolant circuit for the engine while the inlet and outlet ports are connected to a pneumatic pressure system for supplying compressed air to a pneumatically operated clutch for the cooling fan.

Figure 2:
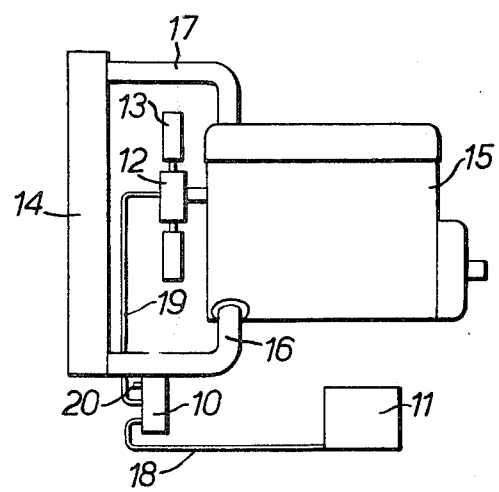

The invention may be performed in various ways and one specific embodiment will now be described by way of example with reference to the accompanying drawings in which:

FIG. 1 is a sectional side elevation through a thermostatic control valve according to the invention, and FIG. 2 is a diagrammatic illustration of a vehicle motor with a cooling fan and a thermostatic fan control system incorporating the valve of FIG. 1.

Referring first to the complete system illustrated in FIG. 2, the internal combustion engine 15 is a water cooled petrol or diesel motor arranged to drive the rear wheels of the vehicle (not shown) and the motor is also arranged to drive a cooling fan having a fan hub 12 and a series of fan blades 13. The cooling circuit of the motor includes a radiator 14, through which air is drawn by the fan, a water hose 17, through which hot water from the engine cooling jacket passes into the upper part of the radiator, and a return hose 16, through which water cooled in the radiator returns to the engine cooling jacket. A water circulating pump and thermostat valve (not shown) are normally included in the coolant circuit.

The fan hub 12 includes a friction clutch for example of the general type described in British Pat. No. 1,310,511, and a pneumatic operating ram, the supply of air to actuate the ram being controlled by a thermostatic valve 10, through which compressed air is delivered from a compressor or other sources of compressed air 11 on the vehicle. Compressed air is supplied to the valve through an input pressure line 18 and is supplied to the fan hub through an output line 19. The valve 10 also has a relief passage 20 communicating with atmosphere. The arrangement is such that when compressed air is supplied to the ram in the fan hub the clutch is disengaged, and when the air pressure is relieved the clutch is automatically engaged by springs within the fan hub.

Referring now to FIG. 1, the valve 10 comprises a valve body or casing 25 having a longitudinal internal bore 26, which is closed at one end by an integral end wall and closed at the other end by a thermal sensing element 27, sealed to the casing by a sealing ring 28 and positively located by a locking ring 29, held in position by a swaged lip 30. The capsule 27 contains a wax designed to expand at a selected temperature and to cause a button 31 at the inner end of the capsule to project. The valve is mounted in the hose 16 of the coolant circuit so that the capsule 27 is exposed to the water flowing through the hose.

The casing of the valve 25 has an inlet port 36 connected to the input pressure line 18, a spaced outlet port 35 connected to the pressure output line 19, and a relief port 37 which may be connected to the relief passage 20 or to a simple relief valve as illustrated at 38. These three ports 35, 36 and 37 communicate with the central bore 26 of the valve at longitudinally spaced positions.

Within the valve bore is mounted a moveable valve element 40, in the form of a plain cylindrical plug having slightly tapered extremities 41, 42. Also moveable within the valve bore is an actuating plunger 43, having a flat face at its left hand end to engage the element 40, a central recess at its other end to fit over the wax capsule button 31, and a surrounding peripheral flange 44, which abuts against a shoulder 47 on the plunger and against the right hand end of the valve element 40. The valve element 40 is a loose fit in the valve bore 26, and the internal surface of the bore is formed with two annular grooves accommodating O-ring seals 50, 52. The length of the plain cylindrical surface of the valve element is somewhat greater than the distance between the two seals.

Assuming that compressed air is supplied through the inlet port 36 the pressure will drive the element 40 to the right against the force of the spring 46 until the tapered portion 41 of the valve element moves clear of the first 'O' ring seal 50. This permits air under pressure to flow past the seal, through the clearance 51 between the valve element and the walls of the bore 26, and thence through the outlet port 35 connected to the pressure line 19. This admits compressed air to the ram in the fan hub and disengages the clutch so that the fan blades 13 are not driven. The power absorbed by the fan, and also the noise generated by the fan, are thus greatly reduced. The cooling effect is also greatly reduced so that the temperature of the coolant water will tend to rise.

When the coolant temperature reaches a predetermined value there is a rapid expansion of the wax in the capsule 27, and the button 31 extends to the left and engages the plunger 46 which shifts the valve element 40 also to the left. The valve engages the seal 50 thus closing off communication between the ports 36 and 35. Further movement of the valve element to the left causes the right hand end taper 42 to move clear of the second 'O' ring seal 52 thus opening communication between the outlet port 35 and the relief port 37. Compressed air within the ram of the fan can thus be discharged to relief and the fan clutch automatically engages under the action of the springs included in the fan hub.

It will be noted that the effective length of the plain cylindrical part of the valve element 40 is slightly greater than the distance between the two seals 50 and 52. This overlap ensures that the engagement at seal 50 will be completed before contact at seal 52 is opened. In this way direct communicated between the pressure inlet 36 and the relief port 37 is avoided. Also it will be noted that the length of the valve element 40 and the clearance at the left hand end of the valve bore 26 will accommodate considerable expansion of the capsule 27 beyond the position where the seal 50 is engaged by the valve element.

If there should be a failure of pressure in the supply line 18 for any reason the spring 46 will urge the valve element 40 towards the left thus making contact at the seal 50 and opening communication between ports 35 and 37 past the seal 52. The fan is therefore automatically engaged by its internal springs. This provides a "fail safe" feature.

The spring 46 may in some forms of the invention be omitted.

It will be noted that the valve element 40 is extremely simple to manufacture and requires only external machining operations. The bore 26 of the valve housing requires substantially no machining apart from the two annular grooves for the 'O' rings 50 and 52. The valve element 40 itself does not make contact with the walls of the valve bore.

I claim:

1. A thermally actuated pneumatic control valve, for selectively supplying air under pressure to or venting a pneumatic service line, comprising a valve casing having a side wall and being closed at one end, a thermal actuator located at the opposite end of said casing and forming a fluid-tight closure for said casing, an inlet port in a side wall of said casing adjacent said closed end thereof, a vent port in a side wall of said casing adjacent said opposite end, and an outlet service port in a side wall of said casing intermediate said inlet vent ports, two spaced resilient sealing elements located respectively in spaced annular grooves formed in the internal surface of said side wall of said casing at positions intermediate said inlet and outlet ports, and said outlet and vent ports respectively, a longitudinally movable valve element within said casing, having an external surface to engage said sealing elements and an effective length at least equal to the spacing between said sealing elements, said valve element being engageable by said thermal actuator but separate therefrom, whereby said valve element is moved by said thermal actuator between a first position adjacent said opposite end of said casing in which said inlet and outlet ports are interconnected and said vent port is closed, and a second position in which said inlet port is closed off from said outlet port and said outlet and vent ports are interconnected, said valve element being movable towards said closed end of said casing independently of said thermal actuator to close off said inlet port from said outlet port in response to a failure of pressure at said inlet port.

2. A control valve according to claim 1, including a spring acting on said valve element urging said element towards the inlet port end of the casing.

3. A control valve according to claim 1, in which said thermal actuator is a wax capsule.

4. A control valve according to claim 2, wherein said spring acts between a part movable with said thermal actuator and a part of said valve element.

5. A control valve according to claim 2, wherein said valve element has a substantially smooth external surface.

* * * * *